(12) United States Patent
Menosky

(10) Patent No.: US 7,201,663 B2
(45) Date of Patent: Apr. 10, 2007

(54) UNIVERSAL JOINT WITH INTEGRAL SEAL DEFLECTOR AND RETAINER ASSEMBLY

(75) Inventor: Marc M. Menosky, Burt, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 677 days.

(21) Appl. No.: 10/434,433

(22) Filed: May 8, 2003

(65) Prior Publication Data

US 2004/0224779 A1    Nov. 11, 2004

(51) Int. Cl.
    F16D 3/41    (2006.01)

(52) U.S. Cl. ....................... 464/133; 277/565

(58) Field of Classification Search ........... 464/128, 464/130, 131, 133; 277/565
    See application file for complete search history.

(56) References Cited

U.S. PATENT DOCUMENTS

| | | |
|---|---|---|
| 1,352,953 A | 9/1920 | Grundy |
| 2,024,777 A | 12/1935 | Neumann |
| 3,238,744 A | 3/1966 | Camossi |
| 3,332,255 A | 7/1967 | Seagreaves et al. |
| 5,324,235 A | 6/1994 | Tomii et al. |
| 5,326,322 A | 7/1994 | Fechter |
| 5,597,356 A * | 1/1997 | Rieder .................. 464/131 |
| 5,928,083 A | 7/1999 | Monahan et al. |
| 6,183,368 B1 | 2/2001 | King et al. |
| 2002/0082093 A1 | 6/2002 | Gibson |
| 2003/0040368 A1 | 2/2003 | Schultze et al. |

FOREIGN PATENT DOCUMENTS

| | | |
|---|---|---|
| DE | 31 18 430 A1 * | 11/1982 |
| DE | 42 22 689 | 1/1993 |
| EP | 1 225 355 A2 | 7/2002 |

* cited by examiner

Primary Examiner—Greg Binda
(74) Attorney, Agent, or Firm—Harness, Dickey & Pierce, P.L.C.

(57) ABSTRACT

A universal joint includes a yoke connected to a cruciform by bearing cup assembly. The bearing cup assembly includes a bearing cup, a bearing and an integral seal deflector retainer. The bearing cup assembly is rotatably coupled to a trunnion of the cruciform. The integral seal deflector retainer includes a case engaging the cruciform to retain the bearing assembly on the trunnion.

10 Claims, 3 Drawing Sheets

UNIVERSAL JOINT WITH INTEGRAL SEAL DEFLECTOR AND RETAINER ASSEMBLY

BACKGROUND OF THE INVENTION

The present invention generally relates to a universal joint for use in a driveline of a motor vehicle. More specifically, the present invention pertains to a universal joint equipped with an integral seal, deflector and retainer for securing a bearing cup assembly to a cruciform trunnion.

As is commonly known, universal joints are used in motor vehicle driveline applications for interconnecting a pair of rotary shafts and permitting changes in angularity therebetween. Many conventional universal joints include a pair of bifurcated yokes which are secured to the rotary shafts. The bifurcated yokes are interconnected by a spider or a cruciform for rotation about independent axes. The cruciform includes four orthogonal trunnions with each opposing pair of axially aligned trunnions mounted in a pair of aligned bores formed in the bifurcated yokes. Typically, a bearing cup is secured in each bore and a bearing assembly is retained in the bearing cup such that each yoke is supported for pivotal movement relative to one of the pairs of trunnions. A seal is coupled to the bearing cup to prevent ingress of contamination into the bearing. A seal washer is positioned between the bearing and the seal to protect the seal from bearing contact and possible damage during use. In addition, a thrust washer is sometimes positioned between the trunnion and the bearing cup to absorb the radially-directed thrust forces which may occur therebetween.

During assembly of the universal joint, difficulties may arise when attempting to couple the bearing assemblies to the bifurcated yokes. Typically, each bearing assembly, thrust washer and bearing cup are positioned on a trunnion but not positively retained thereto. During the assembly process, the bearing cup and bearing assembly may be accidentally disrupted and separated from the trunnion. Gravitational forces may also cause separation of the components during the assembly process. Possible bearing contamination and loss of productivity may result. In some instances, extraneous straps, nets or other packaging are used to retain the bearing cup assemblies in place during shipping and handling. These straps must be removed and discarded by the end user requiring expense of time and cost. Accordingly, it would be advantageous to provide a universal joint having bearing cup assemblies which are retained on the trunnions without the use of external discardable devices.

Furthermore, the manufacture and handling of separate seals, seal washers and retainers is costly. Therefore, it would be beneficial to provide a universal joint having an integral seal, deflector and retainer eliminating the requirement for separate seal washers and retainers.

SUMMARY OF THE INVENTION

The present invention is directed to a universal joint for interconnecting a pair of rotating shafts. The universal joint includes a pair of bifurcated yokes interconnected by a cruciform. The cruciform includes four orthogonal trunnions. An integral seal, deflector and retainer assembly engages each trunnion to protect a bearing assembly positioned within a bearing cup. The integral seal, deflector and retainer assembly includes a case having a first portion engaging the bearing cup and a second portion extending away from the bearing cup. The second portion engages the cruciform to retain the bearing assembly to each trunnion.

BRIEF DESCRIPTION OF THE DRAWINGS

The present invention will become more fully understood from the detailed description and the accompanying drawings, wherein.

DETAILED DESCRIPTION OF THE PREFERRED EMBODIMENT

In general, the present invention is directed to a universal joint of the type used in motor vehicle driveline applications for interconnecting rotating shafts in a manner permitting changes in angularity therebetween.

Figure 1:
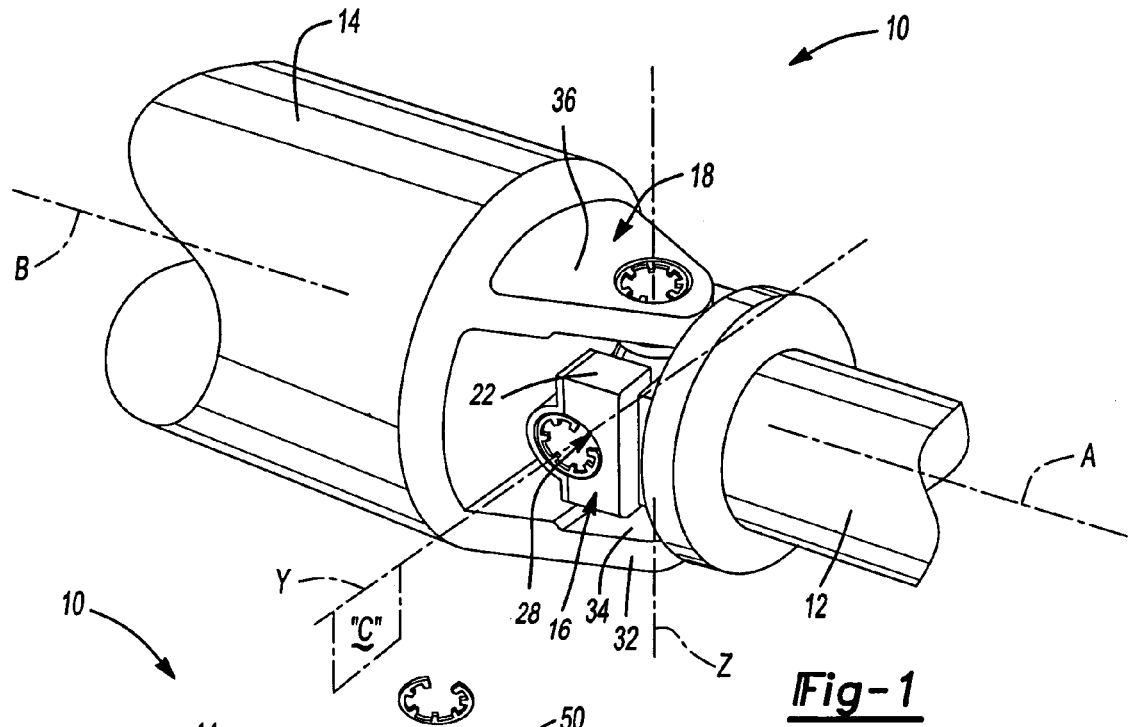
FIG. 1 is a perspective view of a universal joint according to the principals of the present invention.
Figure 2:
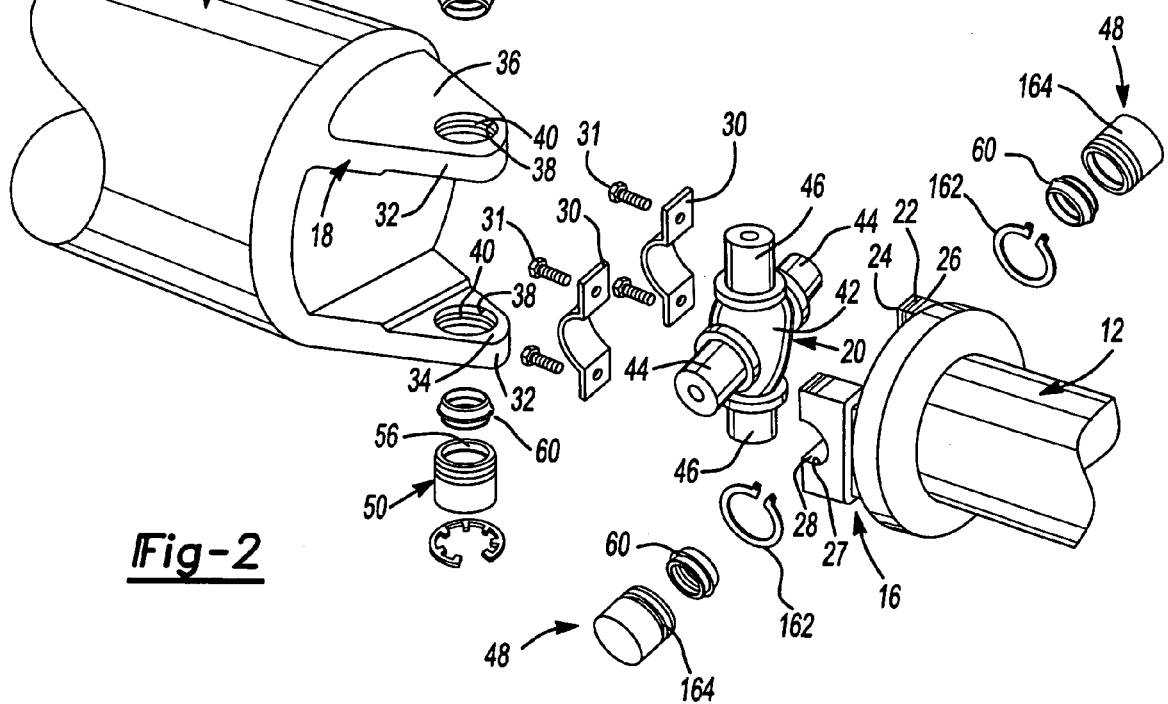
FIG. 2 is an exploded perspective view of the universal joint shown in FIG. 1.

Referring to FIGS. 1 and 2, a universal joint 10 is shown connecting a first shaft 12 to a second shaft 14. In general, universal joint 10 includes a first yoke 16 attached to an end of first shaft 12, a second yoke 18 attached to an end of second shaft 14 and a cruciform 20 interconnecting first yoke 16 to second yoke 18. The first yoke 16 is bifurcated and includes a pair of laterally-spaced legs 22 which are preferably symmetrical with respect to the rotary axis of first shaft 12, as denoted by construction line "A". Legs 22 include an inboard surface 24 and an outboard surface 26 with a journal 27 extending therebetween. Apertures 28 are formed by coupling a pair of end caps 30 to legs 22 via fasteners 31. End caps 30 cooperate with journals 27 to complete apertures 28. Apertures 28 are aligned on a first trunnion axis, as denoted by construction line "Y", which passes through and is orthogonal with respect to rotary axis "A" of first shaft 12.

Second yoke 18 is bifurcated and includes a pair of laterally-spaced legs 32 which are preferably symmetrical with respect to the rotary axis of second shaft 14, as denoted by construction line "B". Legs 32 include an inboard surface 34 and an outboard surface 36 with an aperture 38 extending therebetween. Apertures 38 are aligned on a second trunnion axis, as denoted by construction line "Z", which passes through and is orthogonal with respect to rotary axis "B" of second shaft 14. Apertures 38 are throughbores which include an annular groove 40 formed between the inboard surface 34 and the outboard surface 36. It should be noted that the shape and dimensions of apertures 28 and 38 may either be identical or different depending on the particular dimensions of cruciform 20 used therewith. It should also be noted that the annular ring groove 40 may be formed by machining, casting or by similar technique.

As best seen in FIG. 2, cruciform 20 includes a central hub 42 from which a pair of first trunnions 44 and a pair of second trunnions 46 extend. First trunnions 44 are orthogonal with respect to second trunnions 46. First trunnions 44 are adapted for insertion into apertures 28 in legs 22 of first yoke 16 so as to be axially aligned on first trunnion axis "Y".

Similarly, second trunnions 46 are adapted to be inserted into apertures 38 in legs 32 of second yoke 18 so as to be axially aligned on second trunnion axis "Z". With first trunnions 44 and second trunnions 46 installed in first and second yokes 16 and 18, respectfully, trunnion axes "Y" and "Z" pass through a common plane "C" which orthogonally intersects the rotary axis of cruciform 20, as shown in FIG. 1.

Universal joint 10 also includes a first pair of bearing cup assemblies 48 adapted to be mounted in apertures 28 and a second pair of bearing cup assemblies 50 adapted to be mounted in apertures 38. First bearing cup assemblies 48 are provided for receiving and rotatably supporting first trunnions 44 in apertures 28. Similarly, second bearing cup assemblies 50 are provided for receiving and rotatably supporting second trunnions 46 in apertures 38. For purposes of brevity, the following description will be limited to the components of first bearing cup assemblies 48 with the understanding that the corresponding components of second bearing cup assemblies 50 are substantially identical.

Figure 3:
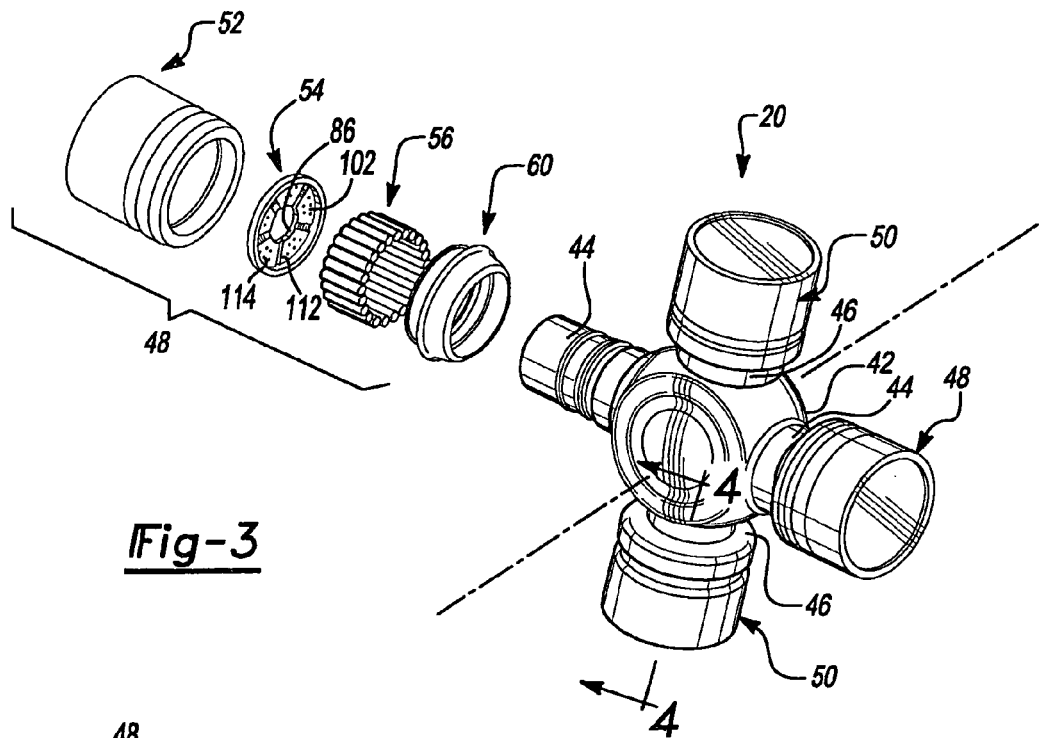
FIG. 3 is a partial exploded perspective view of a cruciform and bearing cup assembly of the present invention.
Figure 4:
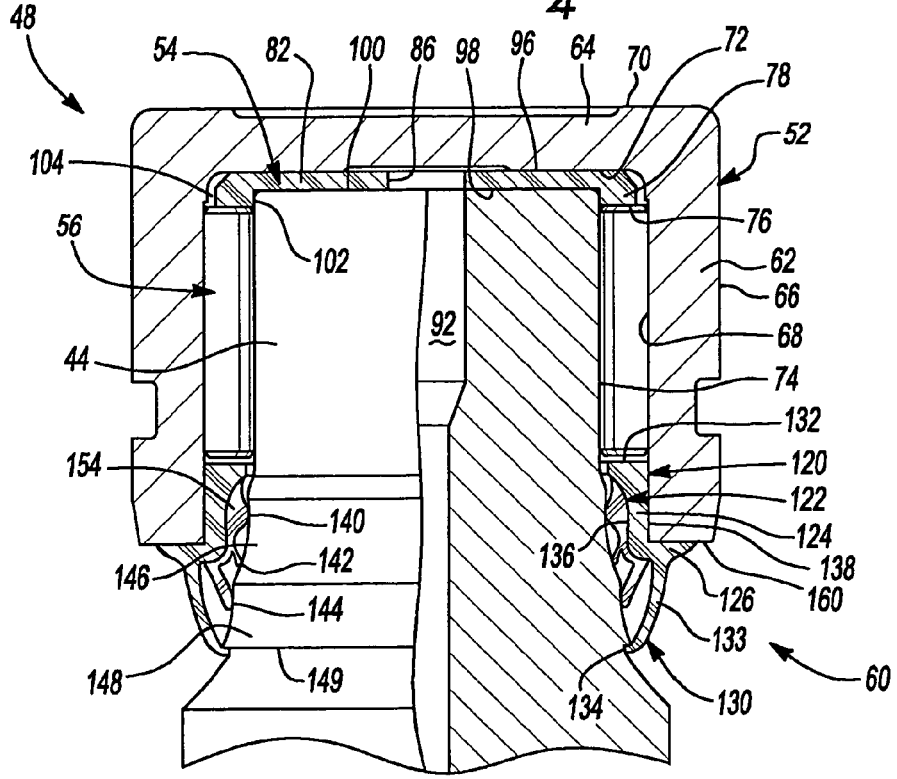
FIG. 4 is a partial cross-sectional side view of a universal joint including an integral seal deflector retainer constructed in accordance with the teachings of the present invention.

FIGS. 3 and 4 depict each bearing cup assembly 48 as including a bearing cup 52, a thrust washer 54, roller bearings 56, and an integral seal, deflector and retainer assembly 60. Bearing cup 52 is substantially hollow and cylindrical in shape. Bearing cup 52 includes a substantially cylindrical tubular segment 62 closed at one end by an end segment 64 and open at the other end. Tubular segment 62 includes an outer wall surface 66 and an inner wall surface 68. End segment 64 includes an outer surface 70 and an inner surface 72. Roller bearings 56 are positioned between inner wall surface 68 and an outer wall surface 74 on a distal portion of trunnion 44 to allow relative rotary movement between bearing cup 52 and trunnion 44. Roller bearings 56 are oriented to rotate on an axis parallel to axis "Y" of trunnions 44 and are arranged in a circumferential array about this axis. One end of each roller bearing 56 is supported to roll against a bearing surface 76 formed on a circumferential flange segment 78 of thrust washer 54. The opposite ends of roller bearings 56 are captured by integral seal, deflector and retainer assembly 60, hereinafter referred to as ISDR 60. ISDR 60 extends between inner wall surface 68 of bearing cup 52 and trunnion 44 to protect roller bearings 56 from contamination and to retain lubricant within bearing cup assembly 48.

As best shown in FIGS. 2–4, thrust washer 54 includes a disk segment 82 from which circumferential flange 78 extends. A central aperture 86 extends through disk segment 82 and is in communication with a lubricant passage 92 found in each trunnion. A fitting (not shown) mounted on central hub 42 of cruciform 20 communicates with lubricant passage 92. The fitting is used to supply lubricant to passage 92 for lubricating roller bearings 56 as well as for providing a lubricant film between relatively moveable surfaces.

Disk segment 82 has an outer face surface 96 which faces and contacts inner surface 72 of bearing cup 52. Disk segment 82 also includes an inner face surface 98 which faces and contacts an end surface 100 of trunnion 44. Inner face surface 98 and outer face surface 96 are substantially parallel such that disk segment 82 has a constant thickness. In addition, thrust washer 54 includes a circumferential inner wall surface 102 and a circumferential outer wall surface 104, as defined by flange segment 78. Circumferential inner wall surface 102 is adapted to face outer wall surface 74 of trunnion 44. Circumferential outer wall surface 104 faces inner wall surface 68 of bearing cup 52. As such, thrust washer 54 functions to align bearing cup 52 and trunnion 44.

Thrust washer 54 includes a series of lubrication grooves 112 which extend radially from central aperture 86 to circumferential inner wall surface 102 of flange segment 78. Grooves 112 are arcuate in profile to define a cylindrical wall surface. It is preferable that an odd number of grooves 112 are provided and which are equally spaced to define a like number of pie-shaped portions of disk segment 82. In addition, a plurality of indentations or dimples 114 are formed on the pie-shaped portions of disk segment 82. Dimples 114 can be randomly oriented or, more preferably, be aligned to define two circumferential rows. Dimples 114 are adapted to retain lubricant therein to provide continuous lubrication over a large area of trunnion end surface 100. In addition, dimples 114 allow contaminants to be removed from the operating surfaces and be collected therein. Thrust washer 54 is constructed from a resilient material such as injection molded plastic.

FIG. 4 depicts ISDR 60 including a case 120 and an elastomer 122 bonded to case 120. Case 120 is preferably constructed from an injection molded thermoplastic. Elastomer 122 is preferably constructed from an injection moldable compound which is resilient and resistant to degradation from exposure to oil, grease, ozone or other commonly present compounds. However, it should be appreciated that case 120 may be partially or completely constructed from other materials such a stamped steel sheet. Case 120 is a generally cup-shaped member. Case 120 includes an annular wall 124, an outwardly extending flange 126, and a substantially conically-shaped deflector 130. Annular wall 124 terminates at a land 132. Land 132 has an increased thickness relative to wall 124 when measured along a line extending parallel to an axis of rotation of bearing cup 52. Deflector 130 includes a tapered wall 133 extending from flange 126. Tapered wall 133 terminates at a lip 134. Case 120 includes an inner surface 136 extending from land 132 to deflector 130. An outer surface 138 is positioned on the opposite side of case 120 from inner surface 136 and extends from land 132 to deflector 130. Elastomer 122 is bonded to inner surface 136 and extends substantially from land 132 to deflector 130.

Elastomer 122 includes a first lip 140, a second lip 142 and a third lip 144. First lip 140 functions as a primary seal and engages trunnion 44 at a first seal race portion 146. FIG. 4 depicts trunnion 44 including first seal race portion 146 having an outer diameter slightly larger than outer wall surface 74 of trunnion 44. One skilled in the art will appreciate that seal race portion 146 may be sized and shaped the same as or differently from outer wall surface 74 without departing from the scope of the present invention. Trunnion 44 also includes a second seal race portion 148 terminates at a groove 149. Groove 49 has a diameter less than adjacent race portion 148 but greater than outer wall surface 74. Race portion 148 is positioned distal of groove 49. First lip 140 is sized to nominally interfere with first seal race portion 146. Because elastomer 122 is constructed from a resilient material, first lip 140 biasedly engages first seal race portion 146.

Second lip 142 is shaped as a wiper extending from a body 154 of elastomer 122. Second lip 142 extends from body 154 at an angle to resist ingress of contaminants. Third lip 144 is also shaped as a wiper radially inwardly extending from body 154. Second lip 142 is spaced apart from first lip 140 and biasedly engages first seal race portion 146. Third lip 144 is constructed to biasedly engage second seal race portion 148 once positioned on trunnion 44. Third lip 144 deflects from an unloaded position (not shown) to the biasedly engaged position shown in FIG. 4. Third lip 144 is cantilevered from body 154 such that ingress of contaminants is resisted. It should be appreciated that lips 140, 142 and 144 are merely exemplary and that they may be constructed to include any number of cross-sectional shapes without departing from the scope of the present invention.

FIG. 4 depicts case 120 engaging bearing cup 52 in a press-fit arrangement. Specifically, annular wall 124 of case 120 engages inner wall surface 68 of bearing cup 52. Outwardly extending flange 126 is seated against an end surface 160 of bearing cup 52. When assembling universal joint 10, bearing cup assembly 48 is preferably completed prior to positioning over trunnion 44. Thrust washer 54 is first inserted within bearing cup 52 such that outer face surface 96 contacts inner surface 72 of bearing cup 52. Roller bearings 56 are next positioned within bearing cup 52. ISDR 60 is press fit to bearing cup 52. At this time, bearing cup assembly 48 may be handled and coupled to cruciform 20. Bearing cup assembly 48 is axially translated to position bearings 56 in contact with outer wall surface 74 of trunnion 44. At this time, first lip 140, second lip 142 and third lip 144 are engaged with their respective seal race portions. Furthermore, deflector 130 is biasedly deformed as lip 134 travels over second seal race portion 148. Lip 134 engages groove 149 in a snap-fit arrangement once bearing cup assembly 48 is properly positioned. Because case 120 is constructed from a relatively resilient material, deflector 130 exerts a force to maintain lip 134 in continuous uninterrupted engagement with groove 149 thereby retaining bearing assembly 48 on trunnion 44. At this time, land 132 is positioned adjacent roller bearings 56.

Figure 5:
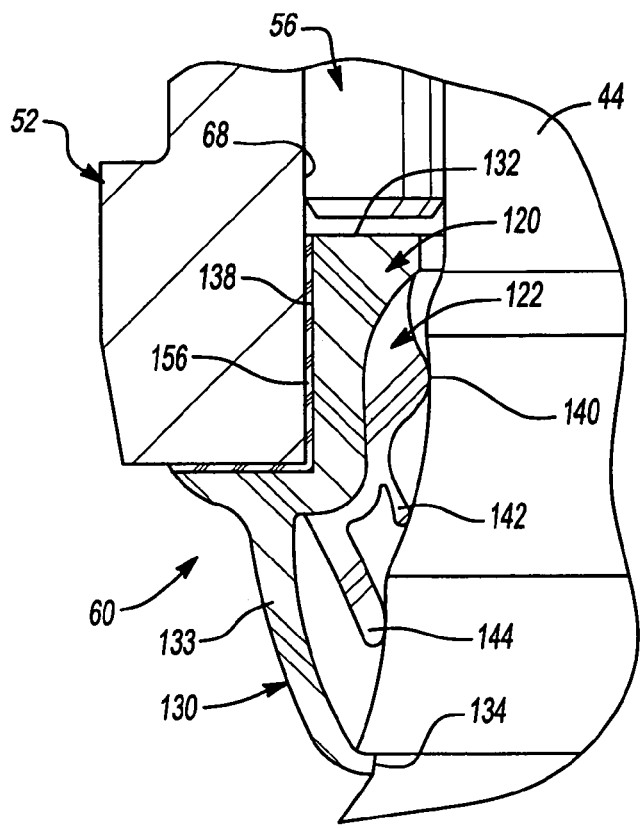
FIG. 5 is a cross-sectional side view of an alternate embodiment integral seal deflector retainer constructed in accordance with the teachings of the present invention.

FIG. 5 depicts an optional elastomeric coating 156 molded or otherwise adhered to outer surface 138. Elastomeric coating 156 provides an additional sealing function to resist ingress of contamination between cup inner wall surface 68 and case 120. Elastomeric coating 156 also provides an increased coefficient of friction thereby increasing the force required to remove ISDR 60 from bearing cup 52.

Figure 6:
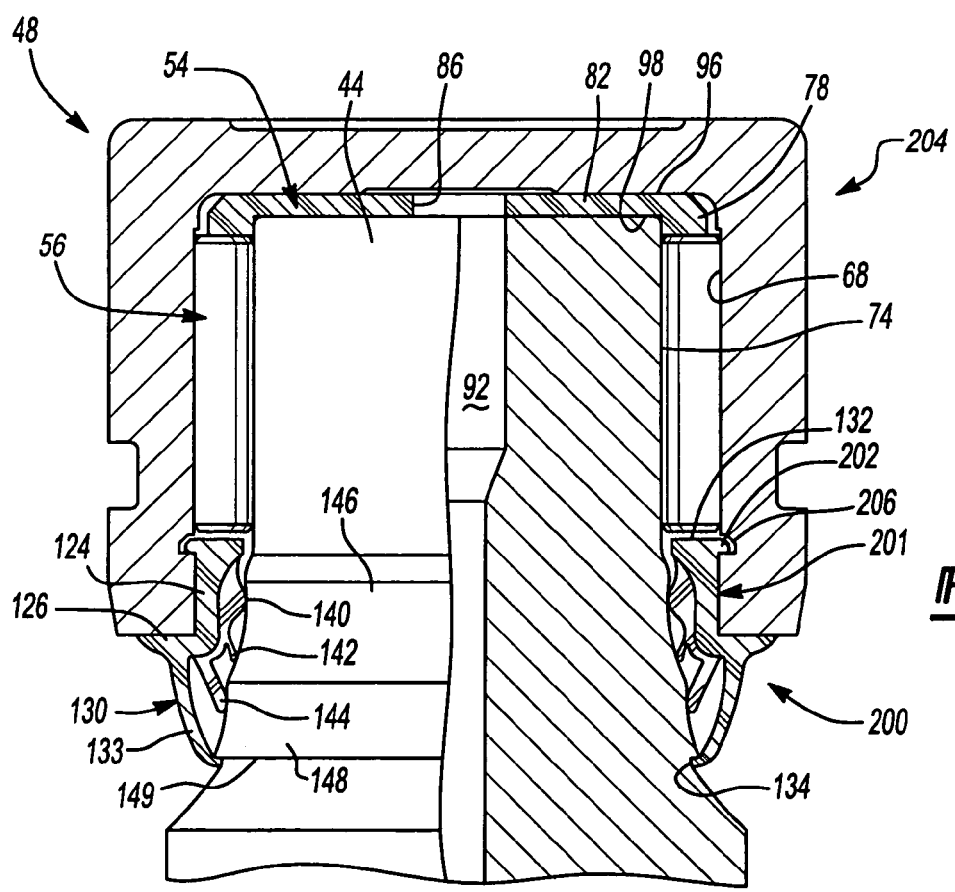
FIG. 6 is a cross-sectional side view of another alternate embodiment integral seal deflector retainer constructed in accordance with the teachings of the present invention.

FIG. 6 depicts an alternate embodiment integral seal, deflector and retainer assembly (ISDR) 200. ISDR 200 is substantially similar to ISDR 60 previously described. Accordingly, like elements will continue to be identified with the previously introduced reference numerals. ISDR 200 includes a case 201 having a radially outwardly extending rim 202 positioned at or near land 132. A modified bearing cup 204 includes a groove 206 positioned on inner wall surface 68. Rim 202 is positioned within groove 206 in a snap-fit arrangement. Case 201 is constructed from an injection moldable material which is resilient and tolerant to deflection such that rim 202 may be inserted within bearing cup 204 and subsequently snapped into place when positioned within groove 206. As previously discussed, lip 134 of deflector 130 engages groove 149 of trunnion 44 to retain bearing cup assembly 48 on the trunnion.

Once bearing cup assemblies 48 and 50 are installed on trunnions 44 and 46, the bearing cup assemblies are inserted into leg apertures 28 and 38. Thereafter, cruciform 20 is centered, dynamically balanced and coupled to legs 22 and 32. A variety of methods for securing yokes 16 and 18 to cruciform 20 are available. One method includes mounting a snap ring 162 within a circumferential groove 164 formed on outer wall surface 66 of bearing cup 52. Snap ring 162 engages inboard surface 24 to retain the bearing assembly. Alternatively, portions of outboard surface 26 surrounding apertures 28 may be deformed using processes such as staking or peening to create local areas which engage outer surface 70 of bearing cup 52. Another method involves injecting molten resin within a passageway extending between the leg and the bearing cup. The molten resin solidifies to retain the bearing cup within the aperture of the leg. Yet another retention method incorporates the use of projections (not shown) extending from legs 22 which may be deformed to engage a snap ring against outer surface 70 of bearing cup 52. One or more of these methods is disclosed in commonly-owned U.S. Pat. Nos. 6,280,335, 6,162,126 and 6,336,868, the entire disclosure of each being hereby incorporated by reference.

Furthermore, the foregoing discussion discloses and describes merely exemplary embodiments of the present invention. One skilled in the art will readily recognize from such discussion, and from the accompanying drawings and claims, that various changes, modifications and variations may be made therein without department from the spirit and scope of the invention as defined in the following claims.

What is claimed is:

1. A universal joint comprising:
a yoke including a leg having a journal;
a cruciform having a trunnion, said cruciform rotatably coupled to said yoke;
a bearing cup mounted on said trunnion, said bearing cup having a tubular segment engaging said journal; and
a seal having a one-piece case and an elastomer coupled to said case, said case including a first portion engaging said tubular segment of said bearing cup and a second portion extending away from said bearing cup, said second portion engaging said cruciform, said elastomer including a plurality of circumferential lips engaging said trunnion.

2. The universal joint of claim 1 wherein said second portion includes a lip biasedly engaging a groove formed in said cruciform to retain said bearing cup on said trunnion.

3. The universal joint of claim 2 wherein said first portion of said case terminates at a land having an increased thickness, said land being positioned proximate to a bearing positioned within said bearing cup.

4. The universal joint of claim 1 wherein said plurality of circumferential lips includes a first lip, a second lip and a third lip spaced apart from one another.

5. The universal joint of claim 4 wherein said second lip is shaped as a wiper being cantilevered from a body portion of said elastomer.

6. The universal joint of claim 1 wherein said case includes a radially extending rim engaging a groove formed in an inner circumferential wall of said bearing cup.

7. The universal joint of claim 1 wherein said tubular segment includes an end face at an open end of said bearing cup, wherein at least one of said plurality of lips is axially positioned between said end face and a distal end of said trunnion.

8. The universal joint of claim 1 wherein said case includes a radially outwardly extending flange engaging an end face of said bearing cup.

9. The universal joint of claim 1 further including a thrust washer positioned between an end surface of said trunnion and said bearing cup.

10. The universal joint of claim 1 wherein said second portion engages said trunnion at a location having a smaller diameter than an adjacent distal section of said trunnion.

* * * * *